(12) United States Patent
Katiyar

(10) Patent No.: US 10,684,786 B2
(45) Date of Patent: Jun. 16, 2020

(54) METHODS FOR PERFORMING GLOBAL DEDUPLICATION ON DATA BLOCKS AND DEVICES THEREOF

(71) Applicant: NetApp, Inc., Sunnyvale, CA (US)

(72) Inventor: Manish Katiyar, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 15/581,512

(22) Filed: Apr. 28, 2017

(65) Prior Publication Data

US 2018/0314452 A1    Nov. 1, 2018

(51) Int. Cl.
*G06F 3/06* (2006.01)

(52) U.S. Cl.
CPC ............ *G06F 3/0641* (2013.01); *G06F 3/067* (2013.01); *G06F 3/0608* (2013.01)

(58) Field of Classification Search
None
See application file for complete search history.

(56) References Cited

U.S. PATENT DOCUMENTS

| | | | | |
|---|---|---|---|---|
| 8,156,306 | B1 * | 4/2012 | Raizen | G06F 3/0608 707/813 |
| 8,612,702 | B1 | 12/2013 | Krishnan et al. | |
| 8,849,767 | B1 * | 9/2014 | Zheng | G06F 3/0641 707/664 |
| 9,449,011 | B1 * | 9/2016 | Chen | G06F 16/1748 |
| 9,460,102 | B1 * | 10/2016 | Bono | G06F 3/06 |
| 2010/0094817 | A1 * | 4/2010 | Ben-Shaul | G06F 3/0608 707/697 |
| 2012/0136841 | A1 | 5/2012 | Ambat et al. | |
| 2012/0158670 | A1 * | 6/2012 | Sharma | G06F 3/0608 707/692 |
| 2012/0330903 | A1 * | 12/2012 | Periyagaram | G06F 3/0608 707/692 |
| 2013/0086007 | A1 * | 4/2013 | Bandopadhyay | G06F 17/30156 707/692 |
| 2013/0151484 | A1 * | 6/2013 | Kruglick | G06F 16/23 707/692 |
| 2013/0262805 | A1 * | 10/2013 | Zheng | G06F 3/0641 711/162 |
| 2014/0114932 | A1 * | 4/2014 | Mallaiah | G06F 3/0608 707/692 |
| 2014/0143213 | A1 * | 5/2014 | Tal | G06F 16/2365 707/692 |
| 2015/0193169 | A1 | 7/2015 | Sundaram et al. | |

(Continued)

OTHER PUBLICATIONS

International Search Report and Written Opinion for PCT/US2018/023950, dated Jun. 27, 2018, pp. 1-10.

*Primary Examiner* — Kaushikkumar M Patel
(74) *Attorney, Agent, or Firm* — Pepper Hamilton LLP

(57) ABSTRACT

A method, non-transitory computer readable medium, and device that assists with performing global data deduplication on data blocks across different volumes includes identifying at least two data blocks stored in two or more storage volumes. It is determined whether the at least two data blocks are classified as a shared data block. A new data volume signature is created when the at least two data blocks are determined to be shared. One of the at least two data blocks that are determined to be shared is deleted and the other one of the at least two data blocks and the created signature in one of the two or more storage volumes is stored.

18 Claims, 4 Drawing Sheets

(56) References Cited

U.S. PATENT DOCUMENTS

| | | | |
|---|---|---|---|
| 2015/0309746 A1* | 10/2015 | Fornander | G06F 3/0608 |
| | | | 711/114 |
| 2016/0366226 A1* | 12/2016 | Friedman | G06F 16/2255 |
| 2017/0010809 A1* | 1/2017 | Hironaka | G06F 12/023 |
| 2017/0017662 A1* | 1/2017 | Hayes | G06F 3/0613 |
| 2017/0212691 A1* | 7/2017 | Katsuki | G06F 3/0608 |
| 2017/0255643 A1* | 9/2017 | Maheshwari | G06F 17/30156 |
| 2017/0262465 A1* | 9/2017 | Goggin | G06F 17/30156 |
| 2018/0074745 A1* | 3/2018 | Harnik | G06F 3/0641 |
| 2018/0173449 A1* | 6/2018 | Sharma | G06F 3/0641 |
| 2018/0173731 A1* | 6/2018 | Nazari | G06F 3/0608 |

* cited by examiner

US 10,684,786 B2

METHODS FOR PERFORMING GLOBAL DEDUPLICATION ON DATA BLOCKS AND DEVICES THEREOF

FIELD

This technology generally relates to data storage management and, more particularly, methods for performing global deduplication and devices thereof.

BACKGROUND

Storage drives or disks provide an easy, fast, and convenient way for backing up or storing data. As additional backups are made, additional disks and disk space are required. However, disks or storage drives add costs to any backup solution including the costs of the disks themselves, costs associated with powering and cooling the disks, and costs associated with physically storing the disks in the datacenter. Thus, it becomes desirable to maximize the usage of disk storage available on each disk.

One method of maximizing storage on a disk is to use some form of data deduplication techniques. Data deduplication is a data compression technique for eliminating redundant data. In an existing deduplication process, first data is compared to stored data to detect duplicates, that is, to identify or determine whether the first data is unique or not. Next, when the first data is identified as not being unique, the redundant first data is eliminated and replaced with a small reference that points to the stored data. However, prior existing technologies only perform data deduplication by comparing the data present in the same storage volume. Unfortunately, prior existing technologies fail to perform data deduplication across different storage volumes.

DETAILED DESCRIPTION

Figure 1:
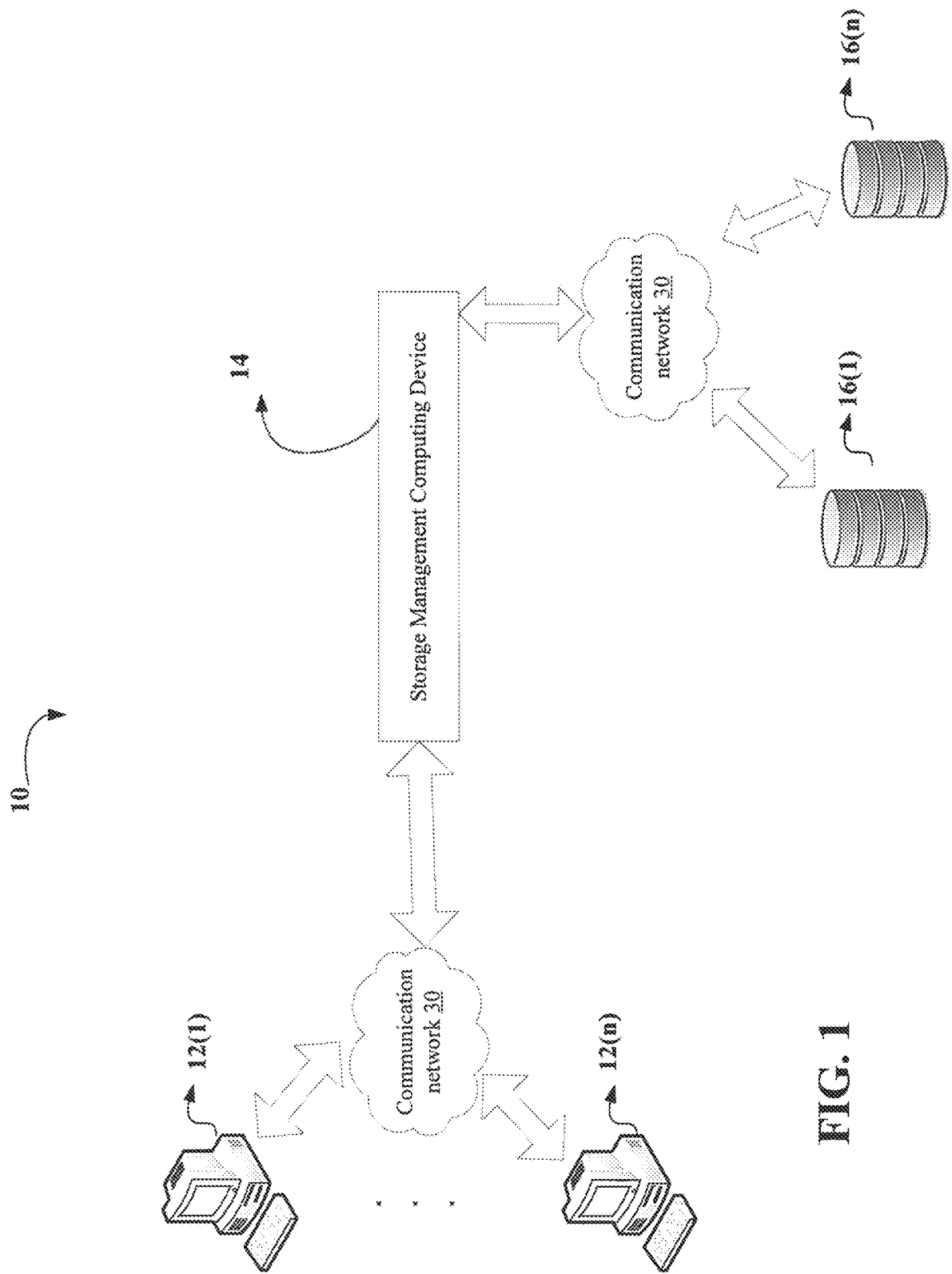
FIG. 1 is a block diagram of an environment with a storage management computing device that performs data deduplication across different storage volumes.

An environment 10 with a plurality of client computing devices 12(1)-12(n), an exemplary storage management computing device 14, a plurality of storage drives 16(1)-16(n) is illustrated in FIG. 1. In this particular example, the environment 10 in FIG. 1 includes the plurality of client computing devices 12(1)-12(n), the storage management computing device 14 and a plurality of storage drives 16(1)-16(n) coupled via one or more communication networks 30, although the environment could include other types and numbers of systems, devices, components, and/or other elements. The example of a method for performs global data deduplication on data blocks stored in different storage volumes in the plurality of storage drives 16(1)-16(n) is executed by the storage management computing device 14, although the approaches illustrated and described herein could be executed by other types and/or numbers of other computing systems and devices. The environment 10 may include other types and numbers of other network elements and devices, as is generally known in the art and will not be illustrated or described herein. This technology provides a number of advantages including providing methods, non-transitory computer readable media and devices for performing global data deduplication on data blocks stored in different storage volumes.

Figure 2:
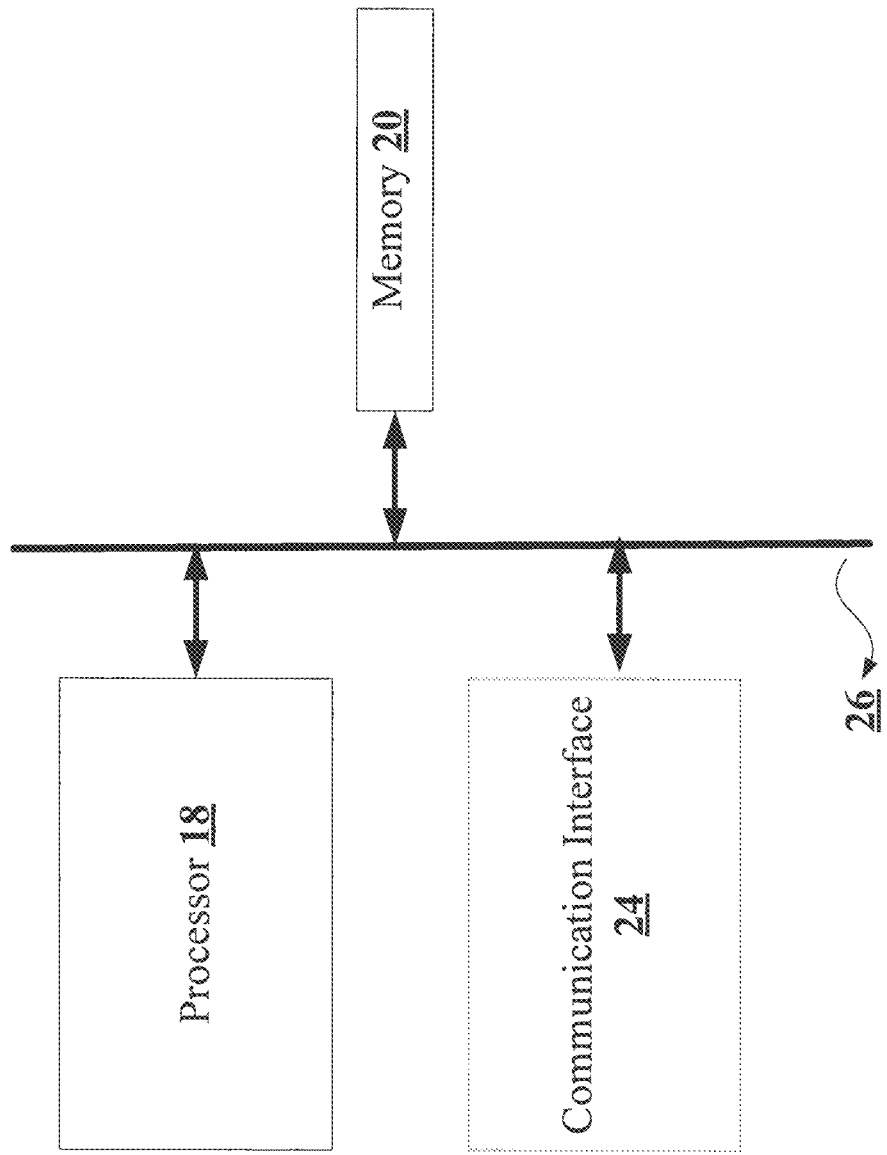
FIG. 2 is a block diagram of the exemplary storage management computing device shown in FIG. 1.
Figure 3:
FIG. 3 is an exemplary flow chart of an example of a method for performing data deduplication across different storage volumes.

Referring to FIG. 2, in this example the storage management computing device 14 includes a processor 18, a memory 20, and a communication interface 24 which are coupled together by a bus 26, although the storage management computing device 14 may include other types and numbers of elements in other configurations.

The processor 18 of the storage management computing device 14 may execute one or more programmed instructions stored in the memory 20 for global data deduplication on data blocks stored in different storage volumes as illustrated and described in the examples herein, although other types and numbers of functions and/or other operation can be performed. The processor 18 of the storage management computing device 14 may include one or more central processing units ("CPUs") or general purpose processors with one or more processing cores, such as AMD® processor(s), although other types of processor(s) could be used (e.g., Intel®).

The memory 20 of the storage management computing device 14 stores the programmed instructions and other data for one or more aspects of the present technology as described and illustrated herein, although some or all of the programmed instructions could be stored and executed elsewhere. A variety of different types of memory storage devices, such as a non-volatile memory, random access memory (RAM) or a read only memory (ROM) in the system or a floppy disk, hard disk, CD ROM, DVD ROM, flash disks, or other computer readable medium which is read from and written to by a magnetic, optical, or other reading and writing system that is coupled to the processor 18, can be used for the memory 20.

The communication interface 24 of the storage management computing device 14 operatively couples and communicates with the plurality of client computing devices 12(1)-12(n) and the plurality of storage drives 16(1)-16(n), which are all coupled together by the communication network 30, although other types and numbers of communication networks or systems with other types and numbers of connections and configurations to other devices and elements. By way of example only, the communication network 30 can use TCP/IP over Ethernet and industry-standard protocols, including NFS, CIFS, SOAP, XML, LDAP, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. In this example, the bus 26 is a universal serial bus, although other bus types and links may be used, such as PCI-Express or hyper-transport bus.

Each of the plurality of client computing devices 12(1)-12(n) includes a central processing unit (CPU) or processor, a memory, and an I/O system, which are coupled together by a bus or other link, although other numbers and types of network devices could be used. The plurality of client computing devices 12(1)-12(n) communicates with the storage management computing device 14 for storage management, although the client computing devices 12(1)-12(n) can interact with the storage management computing device 14 for other purposes. By way of example, the plurality of client computing devices 12(1)-12(n) may run application(s) that may provide an interface to make requests to access, modify, delete, edit, read or write data within storage management computing device 14 or the plurality of storage drives 16(1)-16(n) via the communication network 30.

Each of the plurality of storage drives 16(1)-16(n) includes a central processing unit (CPU) or processor, and an I/O system, which are coupled together by a bus or other link, although other numbers and types of network devices could be used. Each plurality of storage drives 16(1)-16(n) assists with storing data, although the plurality of storage drives 16(1)-16(n) can assist with other types of operations such as storing of files or data. Various network processing applications, such as CIFS applications, NFS applications, HTTP Web Data storage device applications, and/or FTP applications, may be operating on the plurality of storage drives 16(1)-16(n) and transmitting data (e.g., files or web pages) in response to requests from the storage management computing device 14 and the plurality of client computing devices 12(1)-12(n). It is to be understood that the plurality of storage drives 16(1)-16(n) may be hardware such as storage devices including hard disks, solid state devices (SSD), flash disks, magnetic tapes or software or may represent a system with multiple external resource servers, which may include internal or external networks.

Although the exemplary network environment 10 includes the plurality of client computing devices 12(1)-12(n), the storage management computing device 14, and the plurality of storage drives 16(1)-16(n) described and illustrated herein, other types and numbers of systems, devices, components, and/or other elements in other topologies can be used. It is to be understood that the systems of the examples described herein are for exemplary purposes, as many variations of the specific hardware and software used to implement the examples are possible, as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

An example of a method for performing global data deduplication on data blocks stored in different storage volumes will now be described herein with reference to FIGS. 1-4. The exemplary method begins at step 305 where the storage management computing device 14 identifies two data blocks stored in different storage volumes in the same aggregate of the plurality of storage drives 16(1)-16(n), although the storage management computing device 14 can identify any other number of data blocks from other memory locations.

Next in step 310, the storage management computing device 14 computes the checksum for the identified two data blocks. In this example, the storage management computing device 14 can use a commonly available algorithm to calculate the checksum, which can be easily recognized by a person having ordinary skill in the art and therefore will not be illustrated in greater detail.

In step 315, the storage management computing device 14 compares the computed checksum of the two data blocks to identify if they may be an exact match. In this example, when the checksum of the two data blocks is an exact match, then it is determined that the data in the data blocks are similar, although the storage management computing device 14 can use other techniques to determine whether the data blocks are similar. Accordingly, when the storage management computing device 14 determines that the checksum is not an exact match, then the No branch is taken to step 320.

In step 320, the storage management computing device 14 identifies that the two data blocks are not a match and the exemplary flow proceeds back to step 305.

However, if back in step 315, when the storage management computing device 14 determines that the checksum is an exact match, then the Yes branch is taken to step 325. In step 325, the storage management computing device 14 performs a bit by bit comparison to determine if the data in the two data blocks are an exact match, although other techniques can be used to determine if the data in the two data blocks are the exact same. Accordingly, when it is determined that data in the two data blocks are not an exact match, then the No branch is taken back to step 320, that is illustrated above. However when it is determined that the data in the data blocks are an exact match, then the Yes branch is taken to step 330.

In step 330, the storage management computing device 14 determines if the two data blocks are already shared. In this example, the storage management computing device 14 determines if the two data blocks are shared based on data present in a metadata file, although the storage management computing device 14 can use other techniques to determine if they are shared. Further in this example, the metadata file includes data regarding the number of times each of the data block is shared, although the metadata file can include other types or amounts of information. Accordingly, when the storage management computing device 14 determines that the data blocks are not shared, the No branch is taken to step 335.

In step 335, the storage management computing device 14 creates a new signature to indicate that the data blocks are shared. In this example, the storage management computing device 14 creates a new signature based on the location of the data blocks in metadata file, the new address at which the new data blocks will be stored, although the storage management computing device 14 can use other parameters to create a new signature. The exemplary flow proceeds to step 340.

However if back in step 330, the storage management computing device 14 determines that the blocks are already shared, then the Yes branch is taken to step 340. In step 340, the storage management computing device 14 increases the reference count of one of the data blocks in the metadata file indicating that the data block is being shared, although the storage management computing device 14 can modify other types or amounts of data in the metadata file.

Next in step 345, the storage management computing device 14 removes the one of the data block that is stored in one of the volume in the plurality of storage drives 16(1)-16(n) so that the memory space can be used to store other data blocks and the exemplary flow proceeds to step 305.

Figure 4:
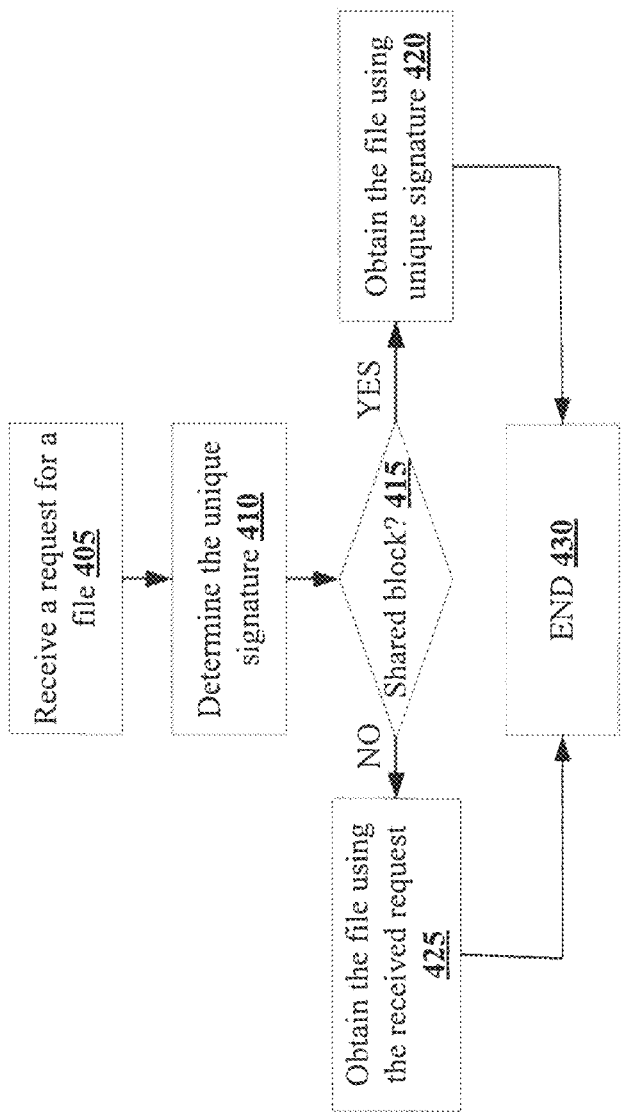
FIG. 4 is an exemplary flow chart of an example of a method for performing read request after performing data deduplication.

Now an exemplary illustration of assisting a read operation on a shared data block will be illustrated with reference to FIG. 4. In step 405, the storage management computing device 14 receives a request to read a file from one of the plurality of client computing devices 12(1)-12(n), although the storage management computing device 14 can receive other types or amounts of requests. In this example, the received request includes the filename and the offset address associated with the filename, although the received request can include other types or amounts of information.

Next in step 410, the storage management computing device 14 determines the unique signature associated with the received request, although the storage management computing device 14 can determine the unique signature using other techniques. In this example, the storage management computing device 14 uses the received filename and identifies the data associated with the filename in the metadata file. Additionally, the storage management computing device 14 also checks if there is a unique signature associated with the filename stored in the metadata file, although the storage management computing device 14 can use other techniques to determine if there is a unique signature associated with the received request. Alternatively, the storage management computing device 14 can determine the unique signature using the metadata in other examples.

Next in step 415, the storage management computing device 14 determines if the requested file has data stored as a shared data block based on the determination of the unique signature and/or additional information stored in the metadata file, although the storage management computing device 14 can use other techniques to determine if the requested file has a shared data block. Accordingly, when the storage management computing device 14 determines that it is a shared data block, then the Yes branch is taken to step 420.

In step 420, the storage management computing device 14 obtains the file from the plurality of storage drives 16(1)-16(n) using unique signature and provides it to the requesting one of the plurality of client computing devices 12(1)-12(n) and the exemplary method ends at step 430.

However if back in step 415, when the storage management computing device 14 determines that it is not a shared block, then the No branch is taken to step 425. In step 425, the storage management computing device 14 obtains the requested file from the plurality of storage drives 16(1)-16(n) using the file offset address that was provided along with the received request and provides it to the requesting one of the plurality of client computing devices 12(1)-12(n); although the storage management computing device 14 can use other parameters to obtain the file. The exemplary method ends at step 430.

Accordingly, as illustrated and described by way of the examples herein, this technology provides a number of advantages including providing methods, non-transitory computer readable media and devices for performing global deduplication on data blocks stored across different volumes in the same aggregate. Using the above illustrated examples, the disclosed technology is able to significantly reduce the storage space of the data blocks in different volumes present in the storage drives thereby managing the memory space in a more efficient manner.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
    creating, by a computing device, a signature based at least in part on a storage address associated with a first one of identical data blocks, when the identical data blocks are determined to be classified as unshared based on a metadata file, wherein the identical data blocks are stored in different ones of a plurality of storage volumes of a same aggregate comprising a plurality of storage drives;
    deleting, by the computing device, a second one of the identical data blocks; and
    storing, by the computing device, the created signature in one of the storage volumes storing the first one of the identical data blocks.

2. The method as set forth in claim 1, further comprising determining, by the computing device, a checksum value for one or more of the identical data blocks.

3. The method as set forth in claim 2, further comprising comparing, by the computing device, one or more of the identical data blocks against another one or more of the identical data blocks upon determining the checksum value.

4. The method as set forth in claim 1, wherein the created signature is stored in the metadata file as associated with a filename of at last one of the first or second one of the identical data blocks.

5. The method as set forth in claim 4, further comprising providing, by the computing device, the file in the received request using the another data volume signature from two or more other data blocks.

6. The method as set forth in claim 1, wherein the new data volume signature is created based on a new starting address of one or more new data blocks to be stored.

7. A non-transitory machine readable medium having stored thereon instructions for global data deduplication comprising executable code which when executed by at least one machine, causes the machine to:
    create a signature based at least in part on a storage address associated with a first one of identical data blocks, when the identical data blocks are determined to be classified as unshared based on a metadata file, wherein the identical data blocks are stored in different ones of a plurality of storage volumes of a same aggregate comprising a plurality of storage drives;
    delete a second one of the identical data blocks; and
    store the created signature in one of the storage volumes storing the first one of the identical data blocks.

8. The non-transitory machine readable medium as set forth in claim 7, wherein the machine executable code, when executed by the machine, further causes the machine to determine a checksum value for one or more of the identical data blocks.

9. The non-transitory machine readable medium as set forth in claim 8, wherein the machine executable code, when executed by the machine, further causes the machine to compare one or more of the identical data blocks against another one or more of the identical data blocks upon determining the checksum value.

10. The non-transitory machine readable medium as set forth in claim 7, wherein the created signature is stored in the metadata file as associated with a filename of at last one of the first or second one of the identical data blocks.

11. The non-transitory machine readable medium as set forth in claim 10, wherein the machine executable code, when executed by the machine, further causes the machine to provide the file in the received request using the another data volume signature from two or more other data blocks.

12. The non-transitory machine readable medium as set forth in claim 7, wherein the new data volume signature is created based on a new starting address of one or more new data blocks to be stored.

13. A computing device, comprising:
   a memory containing machine readable medium comprising machine executable code having stored thereon instructions for global data deduplication; and
   a processor coupled to the memory, the processor configured to execute the machine executable code to cause the processor to:
      create a signature based at least in part on a storage address associated with a first one of identical data blocks, when the identical data blocks are determined to be classified as unshared based on a metadata file, wherein the identical data blocks are stored in different ones of a plurality of storage volumes of a same aggregate comprising a plurality of storage drives;
      delete a second one of the identical data blocks; and
      store the created signature in one of the storage volumes storing the first one of the identical data blocks.

14. The computing device as set forth in claim 13, wherein the processor is further configured to execute the machine executable code to further cause the processor to determine a checksum value for one or more of the identical data blocks.

15. The computing device as set forth in claim 14, wherein the processor is further configured to execute the machine executable code to further cause the processor to compare one or more of the identical data blocks against another one or more of the identical data blocks upon determining the checksum value.

16. The computing device as set forth in claim 15, wherein the created signature is stored in the metadata file as associated with a filename of at last one of the first or second one of the identical data blocks.

17. The device as set forth in claim 16, wherein the processor is further configured to execute the machine executable code to further cause the processor to provide the file in the received request using the another data volume signature from two or more other data blocks.

18. The computing device as set forth in claim 13, wherein the new data volume signature is created based on a new starting address of one or more new data blocks to be stored.

* * * * *